United States Patent
Lai et al.

(10) Patent No.: US 10,673,877 B2
(45) Date of Patent: *Jun. 2, 2020

(54) METHOD AND APPARATUS FOR DETECTING PORT SCANS IN A NETWORK

(71) Applicant: AT&T Intellectual Property I, L.P., Atlanta, GA (US)

(72) Inventors: Wai Sum Lai, Matawan, NJ (US); Andrew Egan, Lake Hopatcong, NJ (US); Wen-Jui Li, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,455

(22) Filed: Jul. 8, 2019

(65) Prior Publication Data

US 2019/0334937 A1 Oct. 31, 2019

Related U.S. Application Data

(63) Continuation of application No. 15/954,161, filed on Apr. 16, 2018, now Pat. No. 10,348,749, which is a (Continued)

(51) Int. Cl.
*G06F 21/31* (2013.01)
*H04L 29/06* (2006.01)
*H04L 12/26* (2006.01)

(52) U.S. Cl.
CPC ........ *H04L 63/1416* (2013.01); *H04L 43/026* (2013.01); *H04L 43/106* (2013.01)

(58) Field of Classification Search
None
See application file for complete search history.

(56) References Cited

U.S. PATENT DOCUMENTS

| | | |
|---|---|---|
| 6,484,203 B1 | 11/2002 | Porras |
| 7,174,566 B2 | 2/2007 | Yadav |

(Continued)

FOREIGN PATENT DOCUMENTS

| | | |
|---|---|---|
| WO | WO2005015871 A1 | 2/2005 |
| WO | WO2014084649 A1 | 6/2014 |

OTHER PUBLICATIONS

Conti, Gregory, and Kulsoom Abdullah. "Passive visual fingerprinting of network attack tools." Proceedings of the 2004 ACM workshop on Visualization and datamining for computer security. ACM, 2004, http://cracking8hacking.com/cracking-hacking/Ebooks/files/001/NW%20ATTACK%20TOOLS.pdf.

(Continued)

*Primary Examiner* — Kaveh Abrishamkar

(57) ABSTRACT

A method and an apparatus for detecting a port scan in a network are disclosed. For example, the method extracts statistics from a message, detects the port scan for a source internet protocol address, determines whether a port scan record exists for the source internet protocol address, creates a port scan record for the source internet protocol address that is extracted when the port scan record does not exist, determines an elapsed time when the port scan record does exist, wherein the elapsed time is determined as a difference between the time stamp that is extracted and a recorded time stamp, sets the recorded time stamp to be the extracted time stamp when the elapsed time is less than an intra-scan time, and determines the port scan has ended for the source internet protocol address when the elapsed time is not less than the intra-scan time.

20 Claims, 7 Drawing Sheets

100

Related U.S. Application Data continuation of application No. 14/527,623, filed on Oct. 29, 2014, now Pat. No. 9,948,661.

(56) References Cited

U.S. PATENT DOCUMENTS

| | | | |
|---|---|---|---|
| 7,500,266 B1 | 3/2009 | Vukelich | |
| 7,624,444 B2 | 11/2009 | Gupta | |
| 7,664,855 B1 | 2/2010 | Freed | |
| 7,716,737 B2 | 5/2010 | Wilken | |
| 7,773,540 B1 | 8/2010 | Zatko | |
| 7,908,655 B1 | 3/2011 | Bhattacharyya | |
| 7,924,720 B2 | 4/2011 | Wackerly | |
| 7,957,372 B2 | 6/2011 | Boulanger | |
| 7,962,957 B2 | 6/2011 | Keohane | |
| 8,181,239 B2 | 5/2012 | Pandya | |
| 8,245,298 B2 | 8/2012 | Pletka | |
| 8,402,537 B2 | 3/2013 | Friedman | |
| 8,516,573 B1 | 8/2013 | Brown | |
| 8,671,438 B2 | 3/2014 | Parker | |
| 8,726,382 B2 | 5/2014 | Knapp | |
| 8,762,515 B2 | 6/2014 | Knapp | |
| 8,813,220 B2 | 8/2014 | Knapp | |
| 9,948,661 B2 * | 4/2018 | Lai | H04L 63/1416 |
| 10,348,749 B2 * | 7/2019 | Lai | |
| 2005/0154733 A1 | 7/2005 | Meltzer | |
| 2007/0180526 A1 * | 8/2007 | Copeland, III | H04L 63/1416 726/23 |
| 2008/0104094 A1 * | 5/2008 | Cowham | H04L 43/00 |
| 2010/0017870 A1 | 1/2010 | Kargupta | |
| 2014/0115688 A1 | 4/2014 | Zuk | |

OTHER PUBLICATIONS

Hwang, Kai, Ying Chen, and Hua Liu. "Defending distributed systems against malicious intrusions and network anomalies." Parallel and Distributed Processing Symposium, 2005. Proceedings. 19th IEEE International. IEEE, 2005. http://gridsec.usc.edu/files/TR/Hwang_SSN2005-IPDPS.PDF.

Kompella, Ramana Rao, Sumeet Singh, and George Varghese. "On scalable attack detection in the network." Proceedings of the 4th ACM SIGCOMM conference on Internet measurement. ACM, 2004. http://60tage.googlecode.com/svn/trunk/papers/DDos/kompella04scalable.pdf.

Paxson, Vern. "Bro: a system for detecting network intruders in real-time." Computer networks 31.23 (1999): 2435-2463. http://static.usenix.org/publications/library/proceedings/sec98/full_papers/paxson/paxson.pdf.

Leckie, Christopher, and R. Kotagiri. "A probabilistic approach to detecting network scans." Network Operations and Management Symposium, 2002. NOMS 2002. 2002, IEEE/IFIP. IEEE, 2002. http://www.csse.unimelb.edu.au/~caleckie/noms2002.pdf.

Roesch, Martin. "Snort: Lightweight Intrusion Detection for Networks." LISA. vol. 99. 1999. http://static.usenix.org/publications/library/proceedings/lisa99/full_papers/roesch/roesch.pdf.

* cited by examiner

METHOD AND APPARATUS FOR DETECTING PORT SCANS IN A NETWORK

This application is a continuation of U.S. patent application Ser. No. 15/954,161, filed Apr. 16, 2018, now U.S. Pat. No. 10,348,749, which is a continuation of U.S. patent application Ser. No. 14/527,623, filed Oct. 29, 2014, now U.S. Pat. No. 9,948,661, all of which are herein incorporated by reference in their entirety.

The present disclosure relates generally to detecting port scans in a network, e.g., a wireless or wire based network.

BACKGROUND

A scanning of ports on network elements may occur for a legitimate activity or an illegitimate activity. For example, a network administrator may perform a legitimate port scan for verifying network inventory and security. However, an attacker may perform an illegitimate port scan to gain access to sensitive network information, and compromise the security of the network and/or the security of computers or servers on the network.

One approach to detect port scans involves setting a fixed threshold on a number of control packets in a given time interval and counting a number of scan packets arrivals. For example, receiving more than 10 scan packets in 5 seconds may be considered a violation of the scan threshold for ports used for User Datagram Protocol (UDP), Transmission Control Protocol (TCP), or Internet Protocol (IP) over Internet Control Message Protocol (ICMP). The violation of the fixed scan threshold for the given time interval may then be used as an indication of a possible illegitimate port scan.

However, over time, an attacker may determine the fixed scan threshold by sending port scans at different intervals. Once the attacker has identified the fixed scan threshold, the attacker may simply perform port scans at a lower rate and avoid detection. The attacker may then proceed to determine active ports, characteristics of the network, and any security vulnerabilities. The attacker may then exploit such knowledge derived from port scans for a future attack, e.g., a denial of service attack.

SUMMARY OF THE DISCLOSURE

In one embodiment, the present disclosure describes a method, computer readable medium and apparatus for detecting a port scan in a network. The method extracts a time stamp, a source internet protocol address, a source port number, a destination internet protocol address, and a destination port number from a message, detects the port scan for the source internet protocol address that is extracted when the source internet protocol address that is extracted is not on a list of source internet protocol addresses of legitimate port scanners, determines whether a port scan record exists for the source internet protocol address that is extracted when the port scan is detected, creates a port scan record for the source internet protocol address that is extracted when the port scan record does not exist for the source internet protocol address, determines an elapsed time when the port scan record does exist for the source internet protocol address, wherein the elapsed time is determined as a difference between the time stamp that is extracted and a recorded time stamp, sets the recorded time stamp to be the extracted time stamp when the port scan record does exist and the elapsed time is less than an intra-scan time, and determines the port scan has ended for the source internet protocol address when the port scan record does exist and the elapsed time is not less than the intra-scan time.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
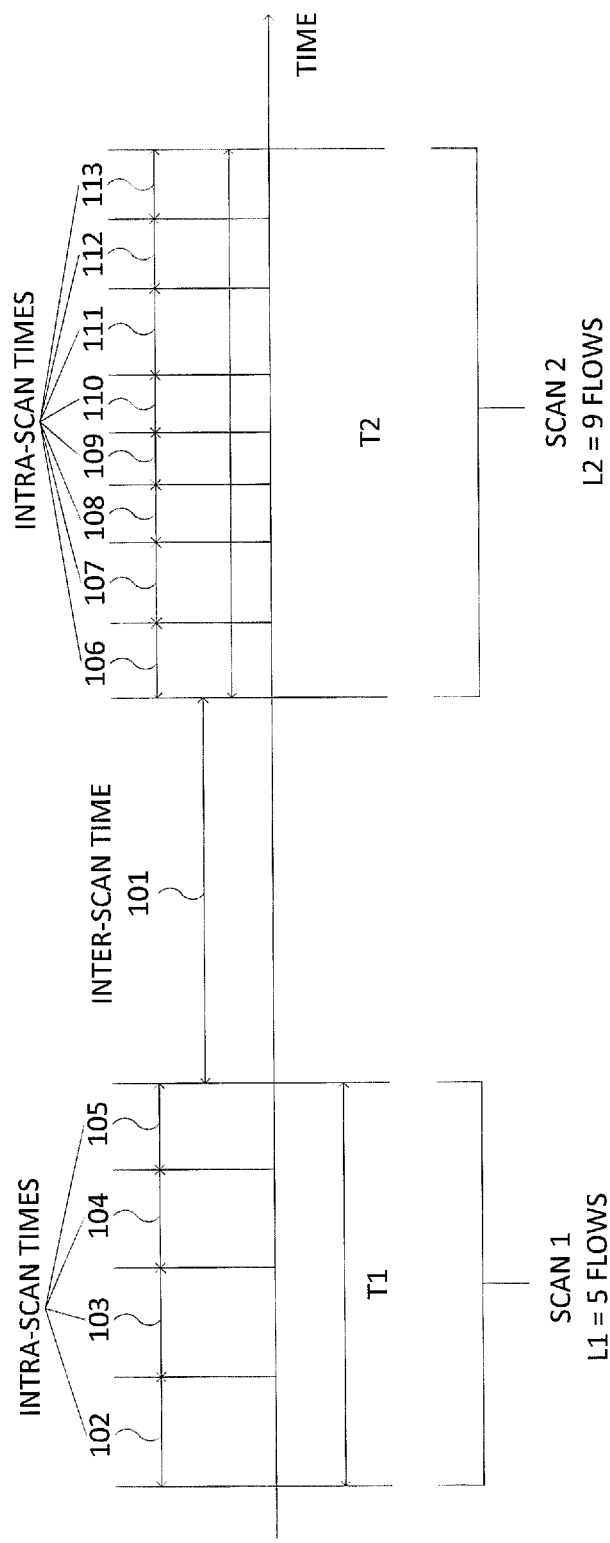
FIG. 1 illustrates an example of a model of the port scan in accordance with the present disclosure.

The present disclosure broadly describes a method, computer readable medium, and apparatus for detecting a port scan in a network. Although the teachings of the present disclosure are discussed below in the context of a core Internet Protocol (IP) network, the teaching is not so limited. Namely, the teachings of the present disclosure can be applied to any network wherein event notification messages (also known as logging messages) are transmitted for setting up a flow of packets from a source to a destination. Namely, the teachings of the present disclosure can be applied to any wireless or wire based networks, wherein detecting when a port scanning activity occurs is beneficial.

A scan comprises a sequence of flows in quick succession from the same source IP address to some destination port(s). There are two types of scans: a horizontal scan and a vertical scan. A horizontal scan is a scan across different hosts in a network to identify important characteristics of the network, e.g., the network topology. A vertical scan is a scan across the ports on a single host to identify which services are available (e.g., which ports are active) and to possibly exploit vulnerabilities of the active ports. The present disclosure refers to both the horizontal and vertical scans as "port scans."

In one embodiment, the present disclosure describes a method for detecting port scans in a network. The port scan may be from an attacker that targets a network or host to locate vulnerabilities in the network or host. The attacker may target one or more of: (a) a specific host to locate any open ports that may be vulnerable, (b) a specific port supporting an application or service with known vulnerability in any susceptible host, or (c) any port in any host as part of a more systematic process to finding and exploiting port vulnerabilities. In one embodiment, the destination ports for port scan packets may comprise different ports at the same destination IP address. In one embodiment, the destination ports may comprise different ports at different IP addresses.

In one embodiment, the destination ports may comprise the same port at different destination IP addresses.

When a flow is setup between a source IP address and a destination IP address for exchanging data, a session is created, an exchange of the data occurs, and then the teardown of the session occurs. Hence, each flow comprises establishment of the session, the exchange of data (if any), and the teardown of the session. When a flow is initially setup and when the flow terminates between a source IP address and a destination IP address, event notification messages are transmitted. For example, if a message logging protocol, such as the "syslog" protocol [Reference: IETF RFC 5424, "The Syslog Protocol," March 2009], is used for event notification in an IP network, a session create message is received when a flow is setup. When the flow ends, a session delete message is received. Accordingly, for each flow that is setup and torn down, the network generates a pair of logging messages, e.g., a pair of syslog messages, comprising a session create message and a session delete message. In one embodiment, the network collects and stores the syslog messages that are generated. In turn, the method of the present disclosure utilizes the syslog messages that are collected and stored by the network to perform scan detection.

Although, event notification messages or logging messages are received for flows that are being setup and for flows that are being terminated, the present disclosure utilizes only the event notification messages that are generated when flows are being setup. For example, the present disclosure uses session create messages, e.g., syslog session create messages, but not session delete messages. It should be noted that although the present disclosure discusses the use of the syslog protocol, the present disclosure is not limited to this specific logging protocol. Other logging protocols can be used by the method as discussed in this disclosure.

In one embodiment, the syslog session create message has several fields. The present disclosure utilizes three (3) fields from the session create syslog message that comprises:

The time stamp field;
The source IP address and port number field; and
The destination IP address and port number field.

The time stamp field records the time instance when a flow setup is established between the source and the destination IP addresses specified in the session create syslog message. For an illustrative example, the three fields of the session create syslog message may indicate:

<150>2014-03-26 20:09:58 {CGN-SET-X} [FWNAT]: ASP_SFW_CREATE_ACCEPT_FLOW sourceIPaddress:sourceport→destinationIPaddress:destinationport.

The "20:09:58" indicates the flow setup time on the date 2014 Mar. 26. The "sourceIPaddress:sourceport" represents the source IP address and the port number from which the port scan packet is received. The "destinationIPaddress:destinationport" represents the destination IP address and the port number to which the port scan packet is directed.

The present disclosure models the port scan such that a scanning activity by a source is detected, regardless of whether the destinations being scanned are different ports at the same destination IP address, different ports at different IP addresses, or the same port at different destination IP addresses.

In order to more clearly describe the teachings of the present disclosure, the following terms will first be defined (with reference to the definition of a port scan as provided above):

Inter-scan time;
Intra-scan time;
Scan length; and
Scan time.

Inter-scan time refers to a time interval between successive port scans from the same source IP address.

Intra-scan time refers to a time interval between successive flows (i.e., between the setup times of successive flows) within a single port scan. In one embodiment, the intra-scan time is required to be less than the inter-scan time.

Scan length, L, refers to the total number of flows in a single port scan.

Scan time, T, refers to the time interval from (the setup time of) the first flow of a particular port scan to (the setup time of) the last flow of the single port scan.

Each port scan may then be represented by at least two parameters comprising the scan length, L, and the scan time, T.

FIG. 1 illustrates an example 100 of a model of the port scan in accordance with the present disclosure. Each vertical line represents a flow. The point at which a vertical line touches the horizontal time axis indicates the setup time of the flow. FIG. 1 illustrates two scans: scan 1 and scan 2. Scan 1 comprises 5 flows and scan 2 comprises 9 flows. The scan lengths of scans 1 and 2, may then be represented by $L_1$ and $L_2$, respectively. Similarly, the scan times of scans 1 and 2, may be represented by $T_1$ and $T_2$, respectively. The inter-scan time 101 is greater than each of the intra-scan times 102-113.

In order to detect port scans of a network, the present disclosure receives and processes messages that are for flows that are being setup. For example, the method may receive syslog session create messages. The method then extracts a time stamp, a source IP address, a source port number, a destination IP address, and a destination port number from the syslog session create message. The method then compares the source IP address against a list of known legitimate source IP addresses. For example, the source IP address may be that of a network administrator.

If the source IP address is not on the list of known legitimate source IP addresses, the method deduces that a port scan is detected and proceeds to determining whether a port scan record is already created for the source IP address. For example, the syslog session create message may be for a first flow of a scan from the particular source IP address.

If a port scan record is not already created, the syslog session create message is determined to be the first flow from the particular source IP address. The method then creates a port scan record for the source IP address. The method also sets a value for a parameter for recorded time stamps. For example, a parameter, recorded time stamp, may be defined for updating of the recorded time stamp of the most recent flow in a port scan from the source IP address. If the flow is a first flow of the present port scan, the value of the recorded time stamp may then be set as being equal to the extracted time stamp, which is the time extracted from the syslog session create message of the first flow. The method also sets or resets an idle timer parameter, idle timer, for the particular source IP address. The length of this idle timer is typically set much longer than the intra-scan time. The method also updates any port scan related statistics for the source IP address. For example, the update may include incrementing a number of flows within a particular port scan, recording the intra-scan time, etc.

If a port scan record already exists for the source IP address, the method determines a difference between the value of the extracted time stamp associated with the syslog session create message being processed and the value of the recorded time stamp, e.g., of an immediate earlier flow. A parameter for an elapsed time, elapsed time, may then be set to the time difference that is determined.

For example, if the syslog session create message being processed is for a fifth flow of a port scan from a particular source IP address, the value of recorded time stamp for the source IP address would have already been set to the value of the time stamp associated with the fourth flow of the present port scan. Then, the time difference between the value of the extracted time stamp associated with the fifth flow and the value of the recorded time stamp (time stamp of the fourth flow) is determined.

The method then compares the elapsed time against the intra-scan time to determine if the value of elapsed time is less than the intra-scan time. If the value of the elapsed time is greater than or equal to the intra-scan time, the previous port scan is deemed to have been finished and a new port scan is deemed to have been initialized. The method then proceeds to output the statistics for the previous port scan by the particular source IP address, and creates a new port scan record for the new port scan by the same source IP address. In addition, the method removes the port scan record for the source IP address that are already processed as part of the previous port scan.

If the elapsed time is less than the intra-scan time, the method sets the recorded time stamp to the value of the newly extracted time stamp. For the example above, the recorded time stamp is set to the value of the time stamp associated with the fifth flow of the present port scan. The method then resets the idle timer and updates the statistics for the source IP address. The method then proceeds to process the next syslog session create message. If another syslog session create message is received for the same source IP address, the time stamp associated with the newly received syslog session create message is extracted, and the elapsed time is set to the time difference between the newly extracted time stamp and the most recent value of the recorded time stamp for the same source IP address. If the value of the elapsed time is again less than the intra-scan time, the new flow is considered to be part of the same port scan. Otherwise, the previous port scan ends and a new port scan is initialized. The process is repeated until all the syslog session create messages are processed or the idle timer for the source IP address expires.

When a particular port scan ends, the method performs an analysis and provides statistics, e.g., summary statistics, for the port scan that ended. In one embodiment, the summary statistics comprise one or more of:

A source IP address;
A destination IP address (if it is the same for all session create syslog messages in the port scan);
A port scan start time;
A port scan end time;
A scan length (a positive integer with a value of at least 1);
A scan sequence number for identifying each of a plurality of successive port scans produced by the source IP address;
An inter-scan time that is determined as the time difference between the time stamp of the last session create syslog message of the previous port scan and the time stamp of the first session create syslog message of the current port scan (if this is not the first port scan on record for the source IP address, undefined otherwise);
A scan time (note that scan time is 0 if scan length is 1, i.e., if a port scan has only one flow);
An average intra-scan time computed as the scan time divided by the scan length; and
A scan rate computed as the scan length divided by the scan time, if the scan time is greater than 0; otherwise scan rate is undefined (e.g., when the scan length is 1).

After providing the statistics as an output, the method removes the port scan records that are already processed for the source IP address. The method continues to check if there are port scan records that ended, such that the statistics of port scan records that have ended are outputted in a timely manner.

Note that the statistics of the port scan record may be used for initializing parameters for detecting port scans by the same source IP address in a future time. For example, if the current port scan is a second port scan by the same source IP address, then an inter-scan time is determined for the second port scan as the time difference between the time stamp of the last syslog session create message of the first port scan and the time stamp of the first syslog session create message of the second port scan. In another example, if the current port scan is a $10^{th}$ port scan by the source IP address, an inter-scan time is determined for the $10^{th}$ port scan as the time difference between the time stamp of the last syslog session create message of the $9^{th}$ port scan and the time stamp of the first syslog session create message of the $10^{th}$ port scan, and so on.

The inter-scan times can then be analyzed such that a proper threshold value can be set for the intra-scan time. As indicated above, an attacker can identify a fixed scan threshold and then simply perform port scans at a different rate to avoid detection. It should be noted that the terms "threshold value for the intra-scan time" and "intra-scan time" are used interchangeably in the present disclosure.

In one embodiment, the present disclosure determines a suitable value for the intra-scan time by analyzing historical records on syslog session create messages. In one embodiment, the method determines the suitable value for the intra-scan time, based on arrival characteristics of the syslog session create messages. In one embodiment, the determining of the suitable value for the intra-scan time from the arrival characteristics is performed dynamically. For example, the method may continue to perform an ongoing analysis on the arrival characteristics of the syslog session create messages, and dynamically adjust the intra-scan time, if necessary. In another embodiment, the method may analyze over a longer period of time of historical records of the intra-scan and inter-scan times in order to determine appropriate values for identifying particular type or types of malicious port scans in a timely manner.

In one embodiment, the method uses adjustments of the intra-scan time for distinguishing between port scans and normal web traffic. For example, web surfing by humans via manual "clicking" of links is a much slower process than a port scan that generally operates at a much higher speed. Thus, the intra-scan times may be used to avoid generating false alarms when regular web browsing by humans may occur.

When a malicious port scan by a source IP address is detected, a notification should be generated, e.g., directed to an automated system or a network administrator who may take a remedial action. The remedial action may comprise one or more of: scrutinizing packets from the source IP address more closely, diverting packets from the source IP address, e.g., to a safe location (e.g., a honey pot), alerting affected customers of such scanning activities, dropping packets from the source IP address (e.g., if a denial of service attack is imminent), closing the vulnerable ports, etc.

In one embodiment, the port scan detection method of the present disclosure is applied to historical traffic data. For example, historical traffic data may be obtained in order to analyze the historical records of syslog session create messages. The analysis on these historical records will be useful for characterizing port scans, e.g., in terms of intra-scan times, scan lengths, scan times, etc. For example, patterns of port scan activities from different IP sources may be discovered.

In one embodiment, the port scan detection method of the present disclosure is applied on real-time streaming data. For example, the syslog session create messages can be streamed to an application server that is performing the analysis in real-time. In one embodiment, the present method performs dynamic adjustments of the intra-scan times when the real-time analysis is performed on the streaming syslog session create messages. Analysis of real-time streaming data facilitates the generation of notifications such as those described above on a real-time basis.

In one embodiment, the intra-scan time is managed by a network service provider based on characteristics of the scan times and scan lengths. For example, a network manager may increase the intra-scan time to identify port scans that may occur at a slow scan rate or decrease the intra-scan time to identify port scans that occur at a fast scan rate. By varying the intra-scan times, the network service provider may then successfully identify port scans regardless of their respective scan rates.

Figure 2:
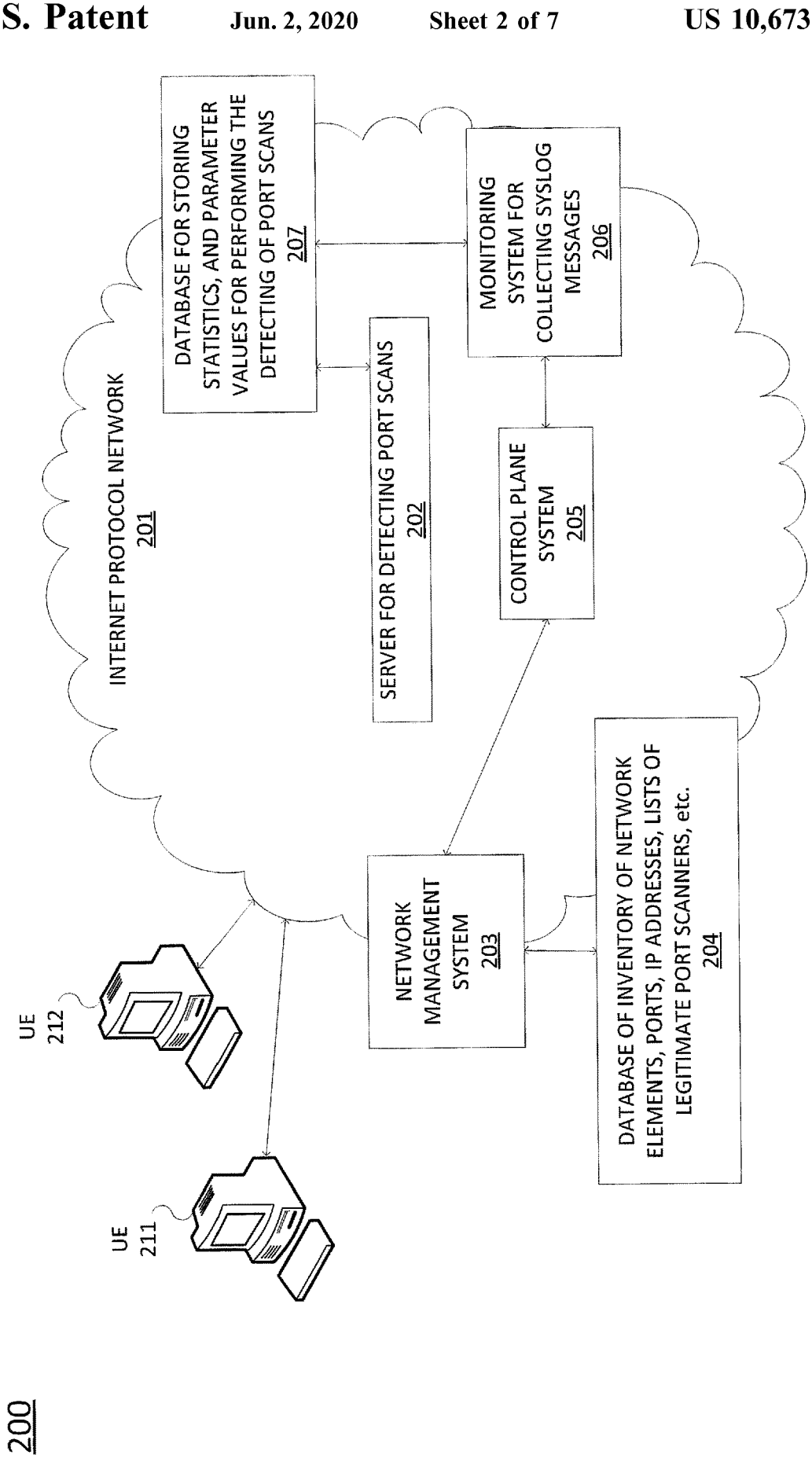
FIG. 2 illustrates an example of a network related to the present disclosure.

FIG. 2 illustrates an example of a network 200 related to the present disclosure. In one illustrative embodiment, the network 200 comprises an IP network 201, e.g., a service provider's IP network. The network 201 may comprise any number of application servers, gateway devices, routers, switches, etc. For example, the network 201 may comprise an application server 202 for detecting port scans in accordance with the present disclosure, a network management system 203, a control plane system 205, a monitoring system 206, and databases 204 and 207.

In one embodiment, the monitoring system 206 may be used for collecting syslog messages from the control plane system 205. The database 204 may be used for storing inventories of network components, e.g., ports, IP addresses of legitimate port scanners, e.g., network administrators. The database 207 may be used for storing parameter values and statistics for use by the application server 202. Users of the method of the present disclosure may access the various statistics stored in database 207 via user endpoint devices 211 and 212.

It should be noted that although various network elements are shown separately in FIG. 2, it is possible that functions performed by these network elements can be combined into fewer network elements, or expanded into a greater number of network elements depending on the deployment requirements. It should also be noted that the above illustrated network 200 is only illustrative and the number of network components or elements are not specifically limited as shown. Any number of network components or elements can be deployed. For example, additional networks can be deployed and any number of network elements may be deployed in each of the networks.

Figure 3A:
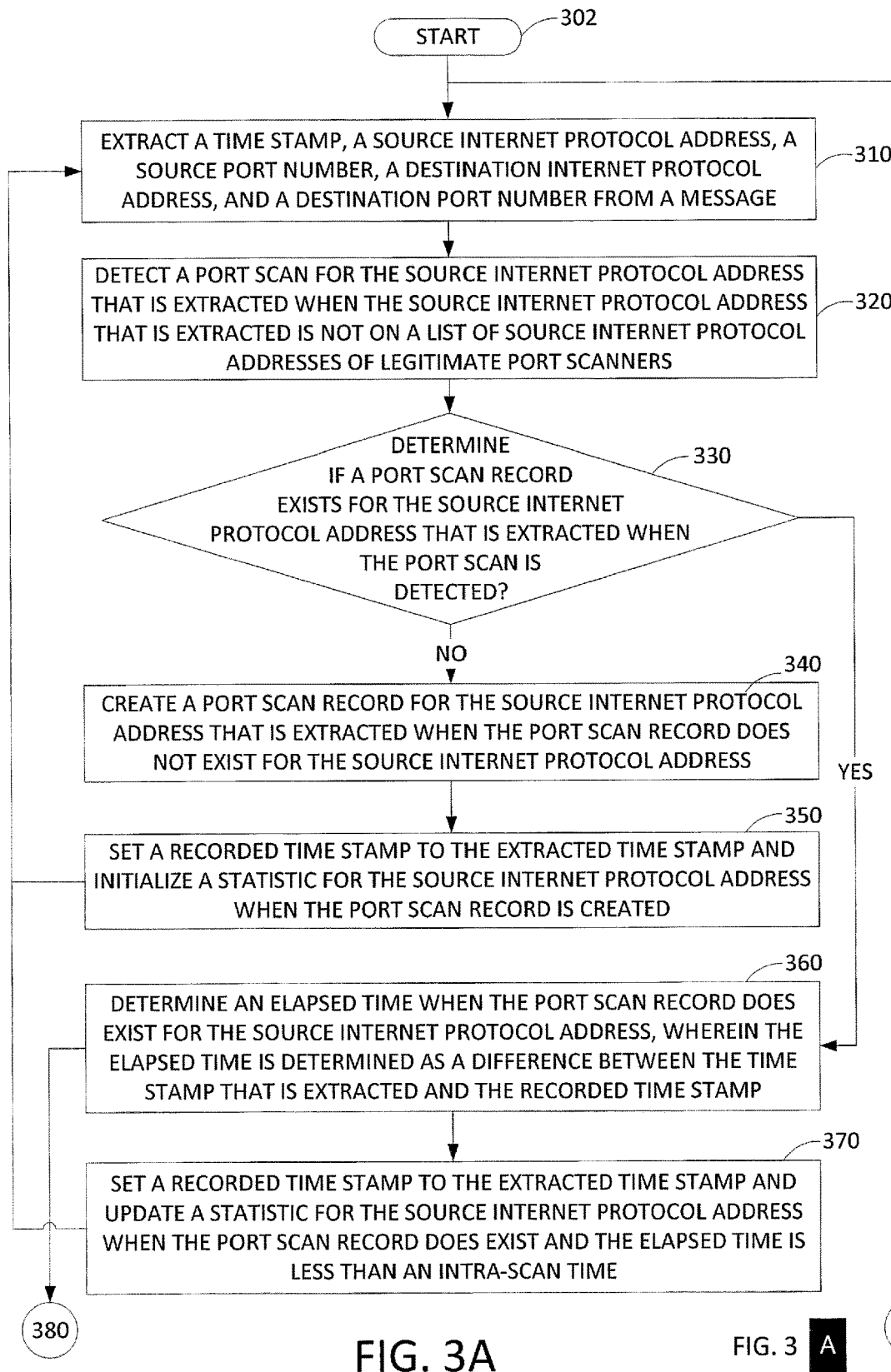
FIG. 3 (shown as FIG. 3A and FIG. 3B in the drawings due to the size of the flowchart) illustrates an example of a flowchart of a method of the present disclosure for detecting a port scan.
Figure 3B:
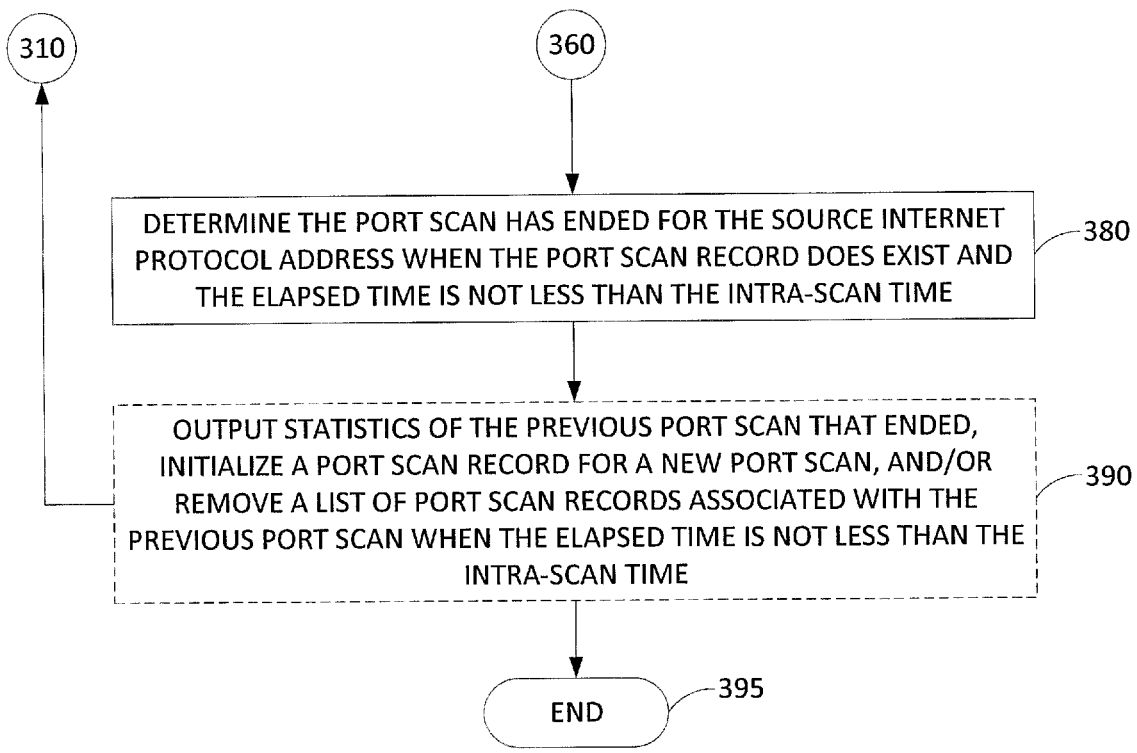

FIG. 3 illustrates a flowchart of a method 300 of the present disclosure for detecting a port scan in a network. For example, the method may be implemented in a server, e.g., an application server of a service provider, a cloud server, etc. Method 300 starts in step 302 and proceeds to step 310.

In step 310, method 300 extracts a time stamp, a source Internet Protocol address, a source port number, a destination Internet Protocol address, and a destination port number from a message, e.g., a syslog session create message.

In step 320, method 300 detects a port scan for the source Internet Protocol address that is extracted when the source Internet Protocol address that is extracted is not on a list of source Internet Protocol addresses of legitimate port scanners. For example, the source Internet Protocol address may be compared against a list of source Internet Protocol addresses of legitimate port scanners, e.g., those of network administrators.

In step 330, method 300 determines if a port scan record exists for the source Internet Protocol address that is extracted when the port scan is detected.

In step 340, method 300 creates a port scan record for the source Internet Protocol address that is extracted when the port scan record does not exist for the source Internet Protocol address. For example, the syslog session create message may be for a first flow of a new port scan. The method then creates a port scan record for the source Internet Protocol address.

In step 350, method 300 sets a recorded time stamp to the extracted time stamp and initializes a statistic (e.g., sets the scan length to 1) for the source Internet Protocol address when the port scan record is created. Method 300 then returns to step 310.

In step 360, method 300 determines an elapsed time when the port scan record does exist for the source Internet Protocol address as determined in step 330, wherein the elapsed time is determined as a difference between the time stamp that is extracted and the recorded time stamp. For example, if a port scan record already exists for the source IP address, the method determines a difference between the time stamp that is extracted for the syslog session create message being processed and the value of the recorded time stamp, which is populated while processing a syslog session create message for a prior flow from the same source Internet Protocol address. For example, if the syslog session create message being processed is for a second flow of a port scan from a particular source IP address, the recorded time stamp would have already been set to the time stamp associated with the first flow of the present port scan. Then, an elapsed time may be set to the value of the difference that is determined.

In step 370, method 300 sets a recorded time stamp to the extracted time stamp and updates a statistic (e.g., increments the scan length by 1) for the source Internet Protocol address when the port scan record does exist and it is determined that the elapsed time is less than an intra-scan time. Method 300 then proceeds to step 310.

In step 380, method 300 determines the port scan has ended for the source Internet Protocol address when the port scan record does exist and it is determined that the elapsed time is not less than the intra-scan time.

In step 390, method 300 outputs statistics of the previous port scan that ended, initializes a port scan record for a new port scan, and/or removes a list of port scan records associated with the previous port scan when the elapsed time is not less than the intra-scan time. Method 300 then proceeds either optionally to step 310, or ends in step 395.

Figure 4A:
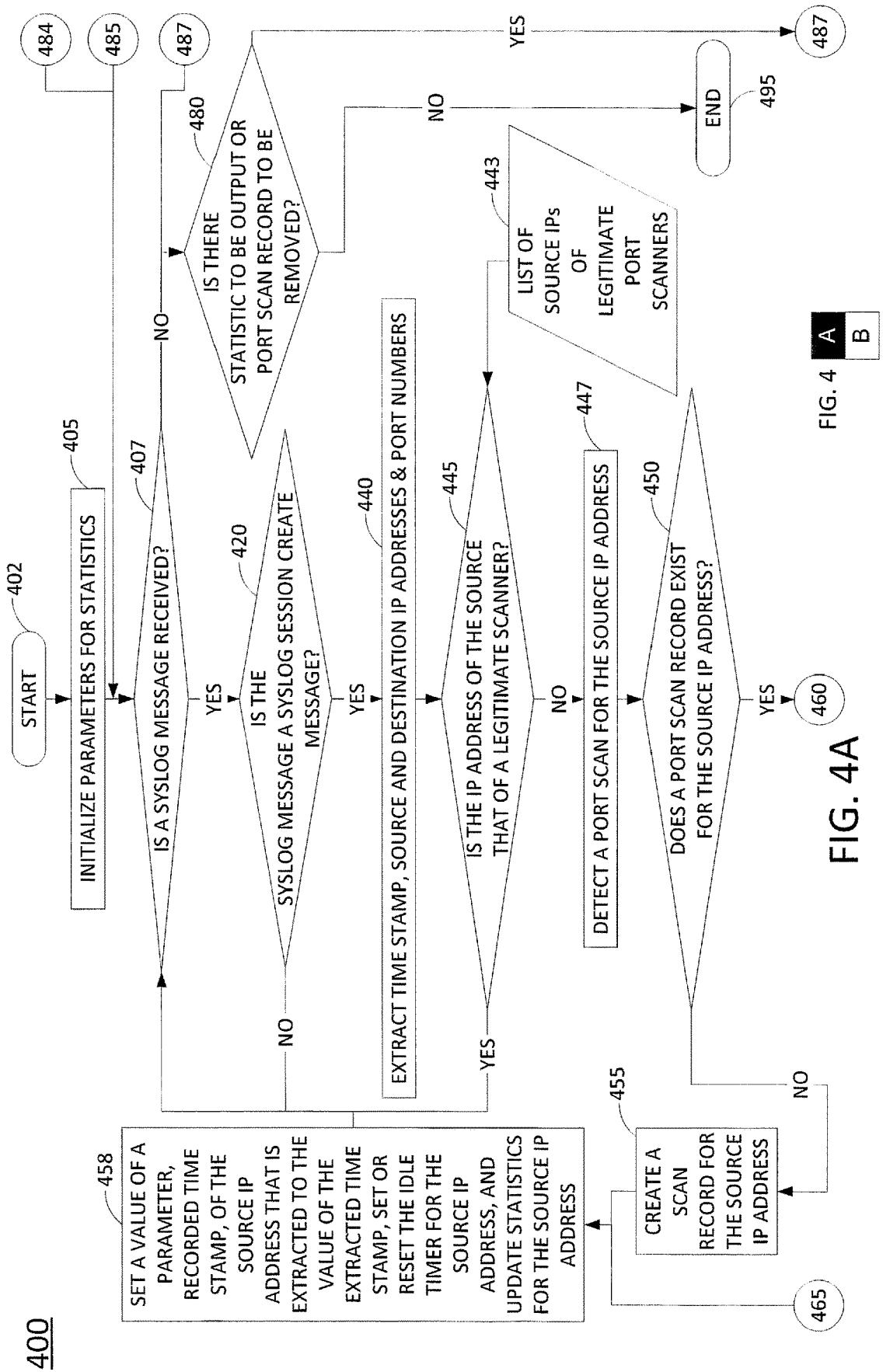
FIG. 4 (shown as FIG. 4A and FIG. 4B in the drawings due to the size of the flowchart) illustrates an example of a flowchart of a method of the present disclosure for detecting a port scan.
Figure 4B:
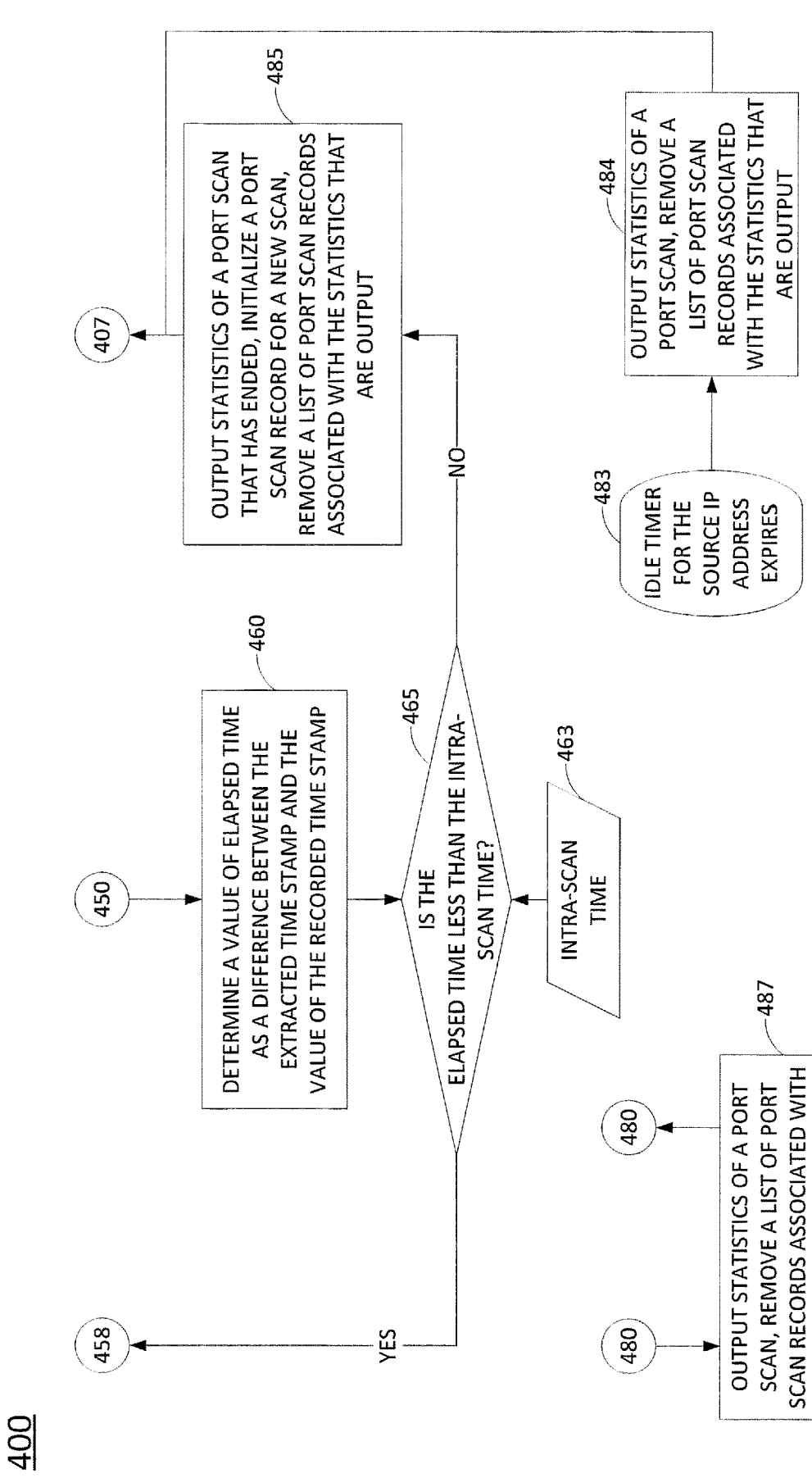

FIG. 4 illustrates an example of a flowchart of method 400 of the present disclosure for detecting a port scan in a network. For example, the method described in FIG. 3 can be presented in a more detailed flowchart as shown in FIG. 4 using a syslog message as an example. Method 400 starts in step 402 and proceeds to step 405.

In step 405, method 400 initializes all parameters. For example, the method may initialize values of various parameters, e.g., recorded time stamp, extracted time stamp, scan sequence numbers, idle timers, etc. The method also receives and initializes a value of an intra-scan time. The length of the idle timer is typically set much longer than the intra-scan time. The method also initializes a list of source IP addresses of legitimate port scanners. For example, the method may receive a most recently updated version of a list of source IP addresses of network administrators, etc.

In step 407, method 400 determines whether a message, e.g., a syslog message, is received. In one example, all syslog messages may have already been processed. In another example, there may be a syslog message that is received and not yet processed. If no unprocessed syslog message is received, the method proceeds to step 480. Otherwise, the method proceeds to step 420.

In one example, the method proceeds to step 480 when an end-of-file is reached on a historical record of syslog messages that is gathered for a network. In another example, the method proceeds to step 480 when a real-time data feed for receiving syslog messages is terminated. In another example, the method proceeds to step 420 when there is at least one syslog message that is received but has not been processed.

In step 480, method 400 determines if there are statistics of at least one port scan to output and/or a list of port scan records to remove. For example, there may be statistics that have not been provided. If there are statistics to output or a list of port scan records to remove, the method proceeds to step 487. Otherwise, the method proceeds to step 495 to end the current method.

In step 487, method 400 ends a port scan for a source Internet Protocol address regardless of the elapsed time since there are no more unprocessed syslog messages for the source Internet Protocol address, outputs the statistics of this port scan that has ended, and/or removes a list of port scan records associated with the port scan. For example, there may be port scan records associated with a port scan for which statistics have been outputted. Once the statistics for the port scan are summarized and provided, the method may then remove the list of port scan records associated with the statistics that have already been provided in terms of an output. The method then returns to step 480.

In step 420, method 400 determines whether the syslog message that is received comprises a syslog session create message. If the syslog message comprises a syslog session create message, the method proceeds to step 440. Otherwise, the method proceeds to step 407. For example, the syslog message may comprise a syslog session delete message. Then, the method will proceed to step 407.

In step 440, method 400 extracts a time stamp, a source IP address, a source port number, a destination IP address, and a destination port number from the syslog message, when the syslog message comprises a syslog session create message. The method then proceeds to step 445.

In step 445, method 400 determines whether the source IP address that is extracted is on a list of source IP addresses of legitimate port scanners. For example, a list of source IP addresses of legitimate port scanners, e.g., network administrators, may be received in step 443. The method then compares the source IP address that is extracted against the list of source IP addresses that is received. For example, the source IP address may be that of a network administrator. If the source IP address that is extracted is not on a list of source IP addresses of legitimate port scanners, the method proceeds to step 447. Otherwise, the method proceeds to step 407.

In step 447, method 400 detects a port scan for the source IP address that is extracted. The method then proceeds to step 450.

In step 450, method 400 determines whether a port scan record exists for the source IP address that is extracted when the port scan is detected. If the port scan record for the source IP address does not exist, the method proceeds to step 455. Otherwise, the method proceeds to step 460.

In step 455, method 400 creates a port scan record for the source IP address that is extracted. For example, the syslog session create message may be for a first flow of a new port scan. The method then creates a port scan record for the source IP address. The method then proceeds to step 458.

In step 458, method 400 sets a value of parameter for recorded time stamp, recorded time stamp, to the extracted time stamp. The method also sets a parameter for an idle timer, idle timer, and updates statistics for the source IP address that is extracted. The method then proceeds to step 407.

In step 460, method 400 determines an elapsed time, wherein the elapsed time is determined as a difference between the time stamp that is extracted and the value of the parameter for the recorded time stamp. For example, if a port scan record already exists for the source IP address, the method determines a difference between the value of the time stamp that is extracted for the syslog session create message being processed and the value of the parameter, recorded time stamp, which is populated while processing the syslog session create message for a prior flow from the same source IP address. For example, if the syslog session create message being processed is for a second flow of a port scan from a particular source IP address, the value of recorded time stamp for the source IP address would have already been set to the value of the time stamp associated with the first flow of the present port scan. Then, the difference between the value of the time stamp that is extracted for the second flow and the value of recorded time stamp is determined. A parameter for an elapsed time, elapsed time, may then be set to the value of the difference that is determined. The method then proceeds to step 465.

In step 465, method 400 determines if the elapsed time is less than an intra-scan time. For example, an intra-scan time may be received in step 463. The method then compares the elapsed time against the intra-scan time to determine if the elapsed time is less than the intra-scan time. If the elapsed time is less than the intra-scan time, the method proceeds to step 458. Otherwise, the method proceeds to step 485.

For example, if the elapsed time is less than the intra-scan time, the current syslog session create message is a continuation of a port scan for which a port scan record already exists. The method then proceeds to step 458. In another example, if the elapsed time is not less than the intra-scan time, the previous port scan is finished and a new port scan is initialized. The method then proceeds to step 485.

In step 483, an idle timer for the source IP address expires and the method proceeds to step 484. For example, an outputting of the statistics of a port scan and/or the removing of the list of port scan records may occur when an idle timer for the source IP address expires. Then, the method proceeds to step 484 upon the expiration of the idle timer.

In step 484, method 400 ends a previous port scan for the source Internet Protocol address, since there has been no new unprocessed syslog session create message for this source Internet Protocol address from the time of its receipt of the last syslog session create message to the time of the idle timer expiry. Method 400 outputs the statistics of the previous port scan, and/or removes a list of port scan records associated with the previous port scan. Once the statistics for the port scan are summarized and provided, the method may then remove the list of port scan records associated with the statistics that have already been provided in terms of an output. Method 400 then proceeds to step 407 to determine if there is a next syslog message that has not been processed.

In step 485, method 400 ends a previous port scan for the source Internet Protocol address when the elapsed time is not less than the intra-scan time, outputs statistics of the previous port scan that has ended, initializes a new port scan record for a new port scan, and/or removes a list of port scan records associated with the previous port scan. For example, there may be port scan records associated with a port scan for which statistics have been outputted. Once the statistics for the port scan are summarized and provided, the method may then remove the list of port scan records associated with the statistics that have already been provided in terms of an output. The method then proceeds to step 407 to determine if there is a next syslog message that has not been processed.

Note that steps 443 and 463 may be performed as part of step 405 or in an entirely different time frame. In one embodiment, the intra-scan time and list of source IP addresses of legitimate port scanners are provided in a pre-determined schedule. In addition, the outputting of statistics, as described above, may occur based on a schedule determined by a network administrator, network security personnel, a network management system, etc.

As such, the present disclosure provides at least one advancement in the technical field of detection of port scans in a network. This advancement is in addition to the traditional detection of port scans that are based on comparing a number of scans of ports within a given time period against a fixed threshold. Viewed in another manner, the present disclosure enables detection of the port scanning activity, even if the attacker learns the value of the fixed threshold and attempts to evade detection by adjusting a rate of sending scan packets to be slower than the fixed threshold.

The present disclosure also provides a transformation of session create message data. For example, data relating to session creation is transformed into data that can be used to determine a port scan.

Finally, embodiments of the present disclosure improve the functioning of a computing device, e.g., a server. Namely, a server for detecting port scans is improved by utilizing the session create message data to provide a more robust port scan detection method.

Figure 5:
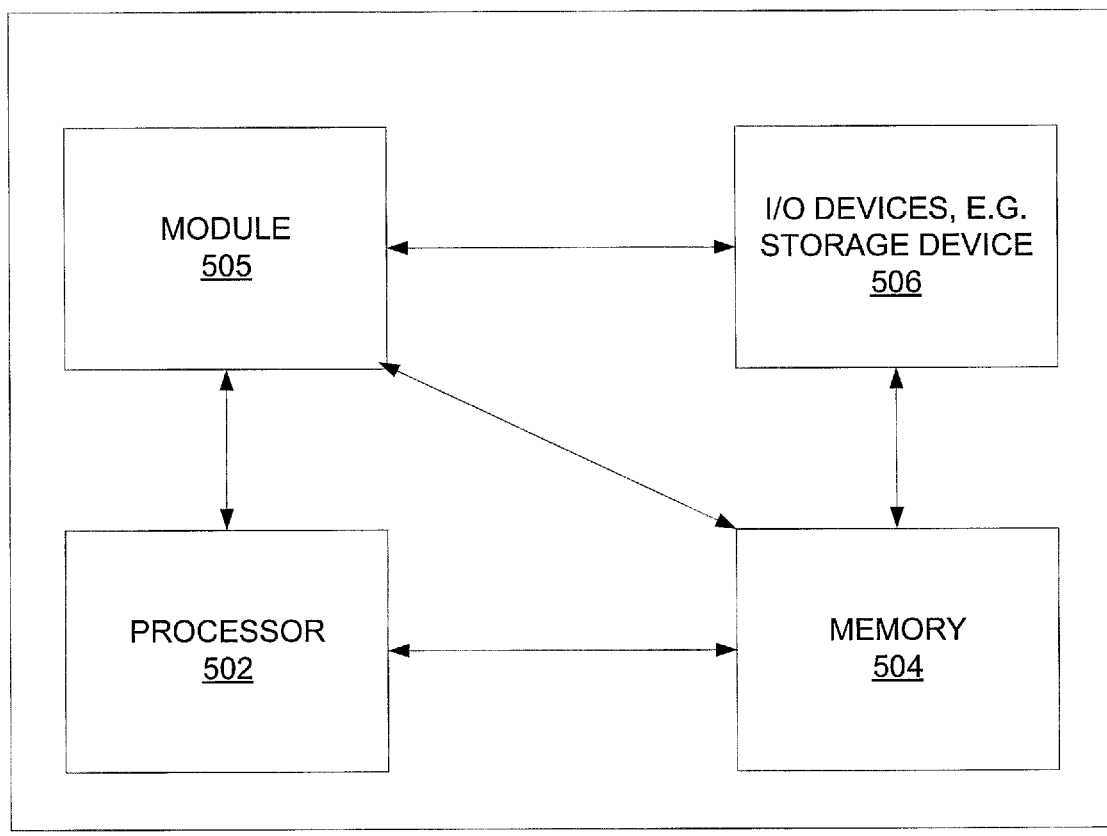
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for detecting port scans in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method 300 or method 400 as discussed above is implemented in a distributed or parallel manner for a particular illustrative example, i.e., the steps of the above method 300 or method 400, or the entire method 300 or method 400 is implemented across multiple or parallel general-purpose computers, then the general-purpose computer of this figure is intended to represent each of those multiple general-purpose computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 505 for detecting port scans in a network (e.g., a software program comprising computer-executable instructions) can be loaded into memory 504 and executed by hardware processor element 502 to implement the steps, functions or operations as discussed above in connection with the illustrative method 300 or method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for detecting port scans in a network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for detecting a port scan in a network, the method comprising:
    extracting, by a processor, a time stamp and a source internet protocol address, from a message;
    detecting, by the processor, the port scan for the source internet protocol address that is extracted when the source internet protocol address that is extracted is not on a list of source internet protocol addresses of legitimate port scanners;

determining, by the processor, whether a port scan record exists for the source internet protocol address that is extracted when the port scan is detected;

creating, by the processor, a new port scan record for the source internet protocol address that is extracted when the port scan record does not exist for the source internet protocol address;

determining, by the processor, an elapsed time when the port scan record does exist for the source internet protocol address, wherein the elapsed time is determined as a difference between the time stamp that is extracted and a recorded time stamp;

setting, by the processor, the recorded time stamp to be the extracted time stamp when the port scan record does exist and the elapsed time is less than an intra-scan time, wherein the intra-scan time comprises a time interval between successive flows within a single port scan; and determining, by the processor, the port scan has ended for the source internet protocol address when the port scan record does exist and the elapsed time is not less than the intra-scan time.

2. The method of claim 1, further comprising:
outputting, by the processor, a statistic of the port scan that ended when the elapsed time is not less than the intra-scan time.

3. The method of claim 1, further comprising:
initializing, by the processor, another new port scan record for a new port scan when the port scan record does exist and the elapsed time is not less than the intra-scan time.

4. The method of claim 1, further comprising:
removing, by the processor, a list of port scan records associated with the port scan.

5. The method of claim 1, further comprising:
setting, by the processor, an idle timer when a statistic for the source internet protocol address is updated.

6. The method of claim 5, further comprising:
outputting, by the processor, the statistic of the port scan when the idle timer expires.

7. The method of claim 1, wherein a statistic of the port scan comprises at least one of: the source internet protocol address, a destination internet protocol address, a port scan start time, a port scan end time, a scan length, a scan sequence number, an inter-scan time, a scan time, an average intra-scan time, and a scan rate.

8. The method of claim 7, wherein the inter-scan time is determined as a time difference between a time stamp of a last message of a previous port scan and the time stamp of a first message of the port scan.

9. The method of claim 7, wherein the average intra-scan time is computed as the scan time divided by the scan length.

10. The method of claim 7, wherein the scan rate is computed as the scan length divided by the scan time.

11. The method of claim 1, wherein the intra-scan time is determined by analyzing historical records of previously received messages.

12. A non-transitory computer-readable storage device storing a plurality of instructions which, when executed by a processor, cause the processor to perform operations for detecting a port scan in a network, the operations comprising:

extracting a time stamp and a source internet protocol address, from a message;

detecting the port scan for the source internet protocol address that is extracted when the source internet protocol address that is extracted is not on a list of source internet protocol addresses of legitimate port scanners;

determining whether a port scan record exists for the source internet protocol address that is extracted when the port scan is detected;

creating a new port scan record for the source internet protocol address that is extracted when the port scan record does not exist for the source internet protocol address;

determining an elapsed time when the port scan record does exist for the source internet protocol address, wherein the elapsed time is determined as a difference between the time stamp that is extracted and a recorded time stamp;

setting the recorded time stamp to be the extracted time stamp when the port scan record does exist and the elapsed time is less than an intra-scan time, wherein the intra-scan time comprises a time interval between successive flows within a single port scan; and determining the port scan has ended for the source internet protocol address when the port scan record does exist and the elapsed time is not less than the intra-scan time.

13. The non-transitory computer-readable storage device of claim 12, the operations further comprising:
outputting a statistic of the port scan that ended when the elapsed time is not less than the intra-scan time.

14. The non-transitory computer-readable storage device of claim 12, the operations further comprising:
initializing another new port scan record for a new port scan when the port scan record does exist and the elapsed time is not less than the intra-scan time.

15. The non-transitory computer-readable storage device of claim 12, the operations further comprising:
removing a list of port scan records associated with the port scan.

16. The non-transitory computer-readable storage device of claim 12, the operations further comprising:
setting an idle timer when a statistic for the source internet protocol address is updated.

17. The non-transitory computer-readable storage device of claim 14, wherein a statistic of the port scan comprises at least one of: the source internet protocol address, a destination internet protocol address, a port scan start time, a port scan end time, a scan length, a scan sequence number, an inter-scan time, a scan time, an average intra-scan time, and a scan rate.

18. The non-transitory computer-readable storage device of claim 17, wherein the inter-scan time is determined as a time difference between a time stamp of a last message of a previous port scan and the time stamp of a first message of the port scan.

19. The non-transitory computer-readable storage device of claim 17, wherein the average intra-scan time is computed as the scan time divided by the scan length.

20. An apparatus for detecting a port scan in a network, the apparatus comprising:
a processor; and
a computer-readable storage device storing a plurality of instructions which, when executed by the processor, cause the processor to perform operations, the operations comprising:

extracting a time stamp and a source internet protocol address, from a message;

detecting the port scan for the source internet protocol address that is extracted when the source internet protocol address that is extracted is not on a list of source internet protocol addresses of legitimate port scanners;

determining whether a port scan record exists for the source internet protocol address that is extracted when the port scan is detected;

creating a new port scan record for the source internet protocol address that is extracted when the port scan record does not exist for the source internet protocol address;

determining an elapsed time when the port scan record does exist for the source internet protocol address, wherein the elapsed time is determined as a difference between the time stamp that is extracted and a recorded time stamp;

setting, by the processor, the recorded time stamp to be the extracted time stamp when the port scan record does exist and the elapsed time is less than an intra-scan time, wherein the intra-scan time comprises a time interval between successive flows within a single port scan; and determining the port scan has ended for the source internet protocol address when the port scan record does exist and the elapsed time is not less than the intra-scan time.

* * * * *